United States Patent
Villa

(10) Patent No.: US 12,181,770 B2
(45) Date of Patent: Dec. 31, 2024

(54) MULTIPLE AIR BRIDGE ELECTRO-OPTIC MODULATOR

(71) Applicant: Lumentum Operations LLC, San Jose, CA (US)

(72) Inventor: Marco Villa, Cabiate (IT)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 17/657,513

(22) Filed: Mar. 31, 2022

(65) Prior Publication Data

US 2023/0266634 A1    Aug. 24, 2023

Related U.S. Application Data

(60) Provisional application No. 63/267,090, filed on Jan. 24, 2022.

(51) Int. Cl.
  *G02F 1/225*   (2006.01)
  *G02F 1/21*    (2006.01)

(52) U.S. Cl.
  CPC ............ *G02F 1/2255* (2013.01); *G02F 1/212* (2021.01)

(58) Field of Classification Search
  CPC ...... G02F 1/2255; G02F 1/212; G02F 1/0356; G02F 1/225
  See application file for complete search history.

(56) References Cited

U.S. PATENT DOCUMENTS

2014/0369637 A1* 12/2014 Hoffmann ............. G02F 1/0356 385/3
2021/0080796 A1   3/2021 Kissa et al.

OTHER PUBLICATIONS

Ian Betty, "InP-Based Electro-Optic Modulators," Ciena, Ottawa, ON, Canada, 2011, 44 pages.

* cited by examiner

*Primary Examiner* — Michael P Mooney
(74) *Attorney, Agent, or Firm* — Harrity & Harrity, LLP

(57) ABSTRACT

In some implementations, an electro-optic modulator may include a waveguide to propagate an optical signal in a direction of propagation. The electro-optic modulator may include a signal electrode, associated with the waveguides, to modulate the optical signal. The signal electrode may include a base structure. The signal electrode may include a loading line structure comprising one or more segments, where a segment, of the one or more segments, connects to the base structure via a plurality of electrically-conductive bridges.

20 Claims, 8 Drawing Sheets

Fig. 2

MULTIPLE AIR BRIDGE ELECTRO-OPTIC MODULATOR

CROSS-REFERENCE TO RELATED APPLICATION

This Patent Application claims priority to U.S. Provisional Patent Application No. 63/267,090, filed on Jan. 24, 2022, and entitled "ELECTRODE FOR ELECTRO-OPTICAL MODULATOR." The disclosure of the prior Application is considered part of and is incorporated by reference into this Patent Application.

TECHNICAL FIELD

The present disclosure relates generally to electro-optic modulators and to an electro-optic modulator that includes an electrode connected to a segment of a loading line via multiple air bridges.

BACKGROUND

Optical modulators, such as electro-optic modulators, impress or modulate electrical signals, such as radio frequency (RF) signals or microwave signals, onto an optical beam in order to generate a modulated optical beam that carries data. In one example, an electro-optic modulator may be a voltage-controlled device that includes a traveling-wave electrode structure positioned in close proximity to an optical waveguide. The electrode structure produces an electric field that overlaps the optical waveguide over a predetermined distance (the interaction length) and causes an electromagnetic interaction that modulates the optical signal. For example, an electro-optic modulator may include a set of RF signal electrodes, a set of ground electrodes, and a set of coplanar optical waveguides. The set of coplanar waveguides can be part of a Mach-Zehnder (MZ) interferometer.

SUMMARY

In some implementations, an electro-optic modulator includes one or more optical waveguides to propagate one or more optical signals in a direction of propagation, one or more signal electrodes, associated with the one or more optical waveguides, to propagate a traveling wave in order to modulate the one or more optical signals through electro-optic interaction, wherein a signal electrode, of the one or more signal electrodes, includes a segmented loading line that covers a portion of an optical waveguide of the one or more optical waveguides, wherein a segment, of the segmented loading line, connects to the signal electrode via a plurality of bridges, and wherein respective positions or geometries of the plurality of bridges are associated with a microwave refractive index of the traveling wave propagating through the one or more signal electrodes.

In some implementations, an electro-optic modulator may include a waveguide to propagate an optical signal in a direction of propagation. The electro-optic modulator may include a signal electrode, associated with the waveguides, to modulate the optical signal. The signal electrode may include a base structure. The signal electrode may include a loading line structure comprising one or more segments, where a segment, of the one or more segments, connects to the base structure via a plurality of electrically-conductive bridges.

In some implementations, an electro-optic modulator includes an optical waveguide to propagate one or more optical signals in a direction of propagation, a signal electrode, associated with the optical waveguide, to propagate a modulation signal in the direction of propagation in order to modulate the one or more optical signals through electro-optic interaction, wherein the signal electrode, of the one or more signal electrodes, includes a segmented loading line that covers a portion of the optical waveguide, wherein a segment, of the segmented loading line, connects to the signal electrode via a first bridge and a second bridge, and wherein respective positions or geometries of the first bridge and the second bridge are associated with a microwave refractive index of the modulation signal propagating through the signal electrode.

DETAILED DESCRIPTION

Figure 1A:
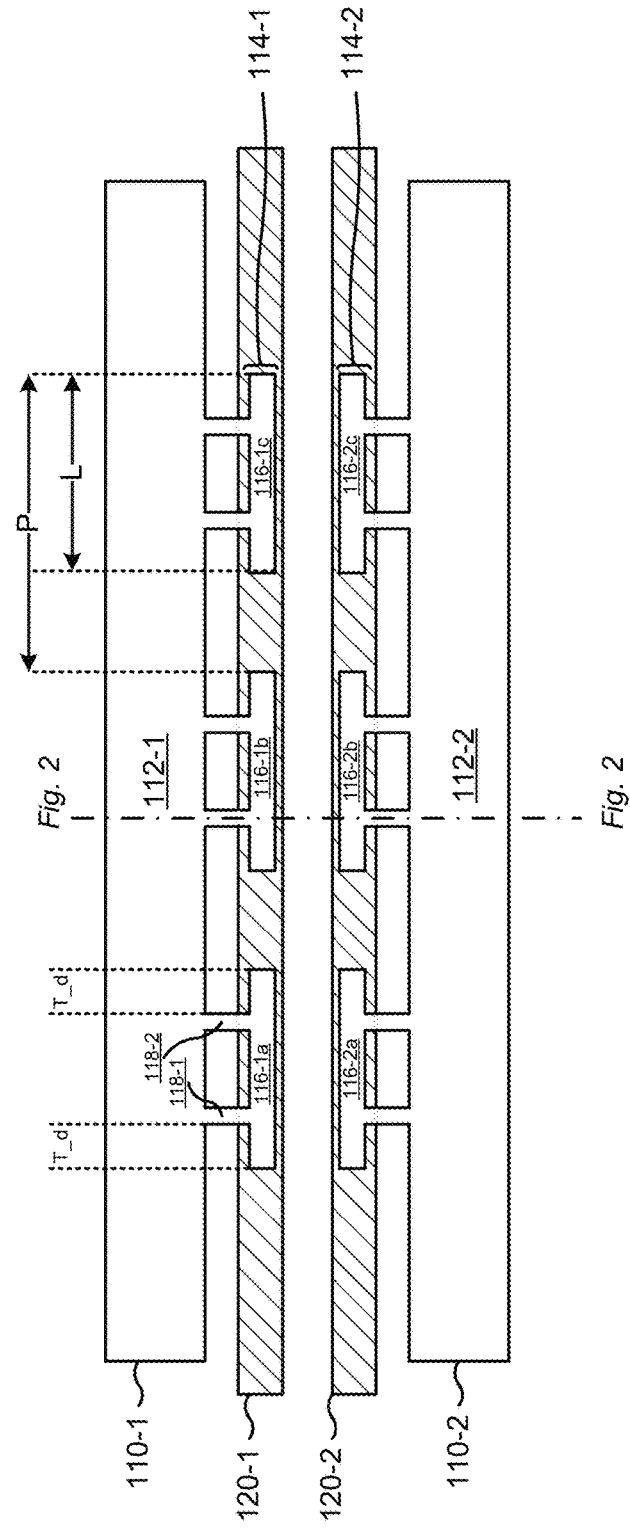
FIGS. 1A-1C are diagrams of an example electro-optic modulator described herein.

The following detailed description of example implementations refers to the accompanying drawings. The same reference numbers in different drawings may identify the same or similar elements.

An electro-optic modulator may modulate an optical signal over an electro-optic bandwidth. The electro-optic bandwidth may be increased by reducing electrical (e.g., RF) signal loss, such as by reducing an interaction length of an electrode and an optical waveguide of the electro-optic modulator (e.g., by reducing a length of the electrode). However, reducing the interaction length may result in an increase in a drive voltage of the electro-optic modulator. Another approach uses an equalization technique to increase electro-optic bandwidth and reduce drive voltage. According to the equalization technique, the electro-optic modulator may include an electrode path delay (e.g., a circuitous path of the electrode) to provide a time delay of the electrical signal, and may include a modulation polarity reversal, for example, to adapt to a phase shift caused by the time delay. However, the electrode path delay also may increase electrical signal loss (e.g., by increasing the length of the electrode). Moreover, the electrode path delay increases a footprint of the electro-optic modulator, which may cause interference (e.g., crosstalk) between electrodes of multiple nested electro-optic modulators.

A limiting factor in the electro-optic bandwidth is a mismatch between a first velocity of a traveling wave (e.g., an RF wave) and a second velocity of a light wave in medium (e.g., in an optical waveguide). As an example, in an absence of microwave propagation losses, a 3 decibel (3 dB) bandwidth frequency can be determined based on an equation:

$$f_{3dB} = \frac{1.4c}{L\pi |Nm - Nopt|}$$

where $f_{3dB}$ is the 3 dB bandwidth frequency, c is the speed of light in a vacuum, L is an RF electrode length, Nm is a microwave refractive index (which corresponds to a velocity of a traveling wave), and Nopt is an optical refractive index. Accordingly, when Nm→Nopt, there is a match between an electrical signal and an optical signal resulting in $f_{3dB}$→∞ (e.g., the electro-optic bandwidth is limited only by the microwave propagation losses). Accordingly, it is desirable to configure an electro-optic modulator such that Nm is a close to Nopt as possible to maximize the 3 dB bandwidth frequency and the electro-optic bandwidth. However, configuring an electro-optic modulator to cause Nm to be as close to Nopt as possible may result in a non-optimal value for a modulation voltage (Vpi). As a result, higher voltage drivers may be used to drive a system including such an electro-optic modulator, which may result in an increase in electrical power consumption and an increase in heat for dissipation.

Some implementations described herein provide an electro-optic modulator with an improved electro-optic bandwidth. The electro-optic modulator may include a loading line segment connected to a base structure of a signal electrode using multiple air bridges. For example, the electro-optic modulator may include a signal electrode base structure and a segmented loading line that includes at least one segment connected to the base structure using multiple air bridges. In this case, by connecting a segment to the base structure using multiple air bridges, rather than a single air bridge as is used on a typical electro-optic modulator, fine tuning of a value for Nm (e.g., moving Nm closer to Nopt) is achieved without negatively impacting a value for a modulation voltage Vpi. Additionally, or alternatively, altering the quantity and/or relative position of the multiple air bridges on a segment enables further fine tuning of a value of Nm to maximize a 3 dB bandwidth frequency. In this way, using multiple air bridges provides greater flexibility in configuring the electro-optic modulator and improves performance of the electro-optic modulator.

Figure 1B:
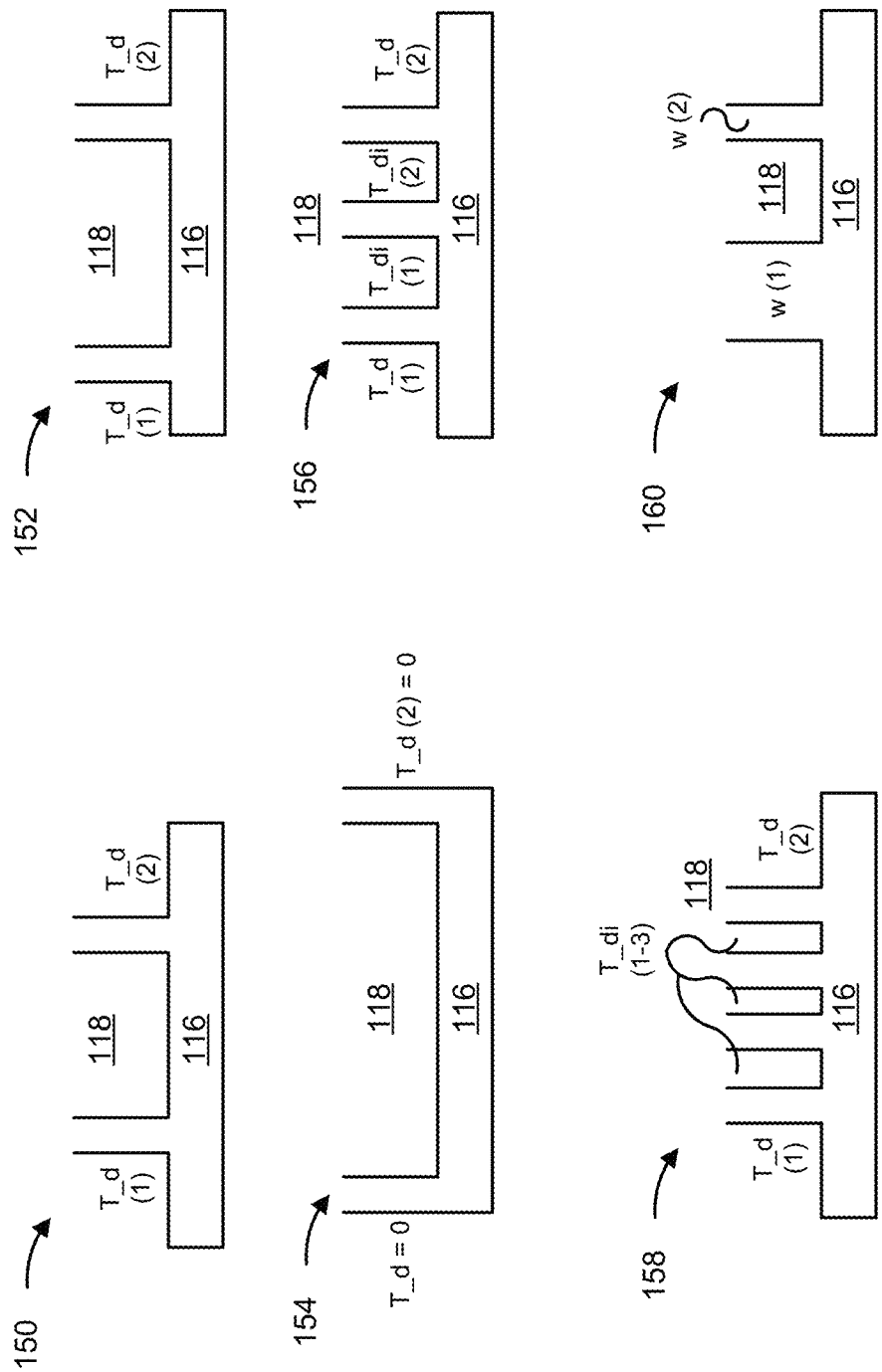
Figure 1C:
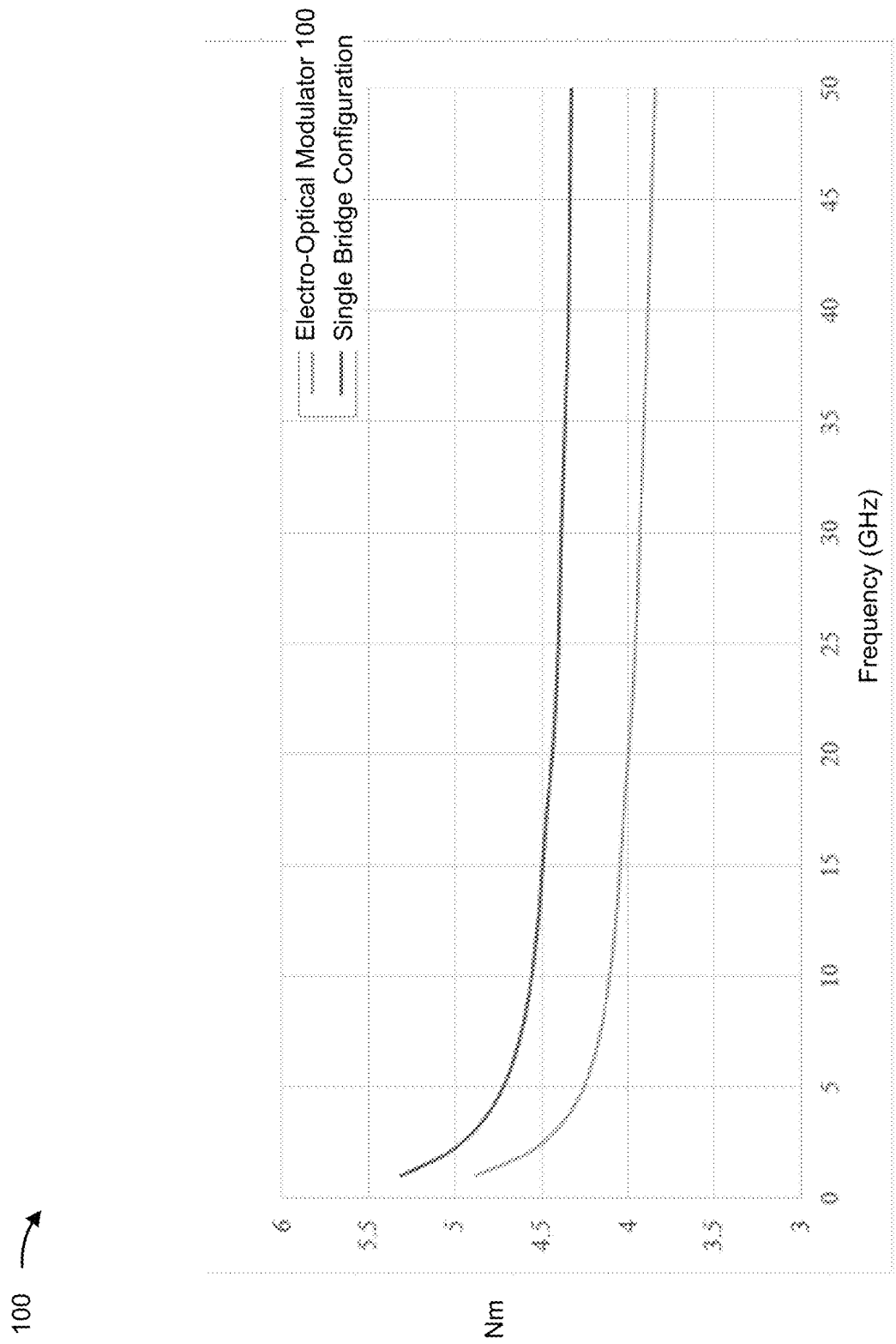

FIGS. 1A-1C are diagrams of an example electro-optic modulator 100. As shown in FIG. 1A, the electro-optic modulator 100 includes a set of electrodes 110 and a set of waveguides 120.

In some implementations, an electrode 110, such as a first electrode 110-1 or a second electrode 110-2, may be a signal electrode that modulates one or more optical signals propagating through a corresponding waveguide 120, such as a first waveguide 120-1 or a second waveguide 120-2, respectively. For example, an electrode 110 may be driven with an electrical signal that interacts with an optical signal propagating through a waveguide 120 through electro-optic interaction. In some implementations, to cause the electro-optic interaction between the electrical signal and the optical signal, an electrode 110 may include a base structure 112 and a loading line 114. For example, the electrode 110-1 includes a first base structure 112-1 and a first loading line 114-1 and the electrode 110-2 includes a second base structure 112-2 and a second loading line 114-2. In this case, a base structure 112 may include one or more conductive layers and/or insulating layers to enable the signal to be directed to a loading line 114, as described herein with regard to FIG. 2.

A loading line 114 may be a segmented loading line including multiple segments 116. For example, the loading line 114-1 may include a first set of segments 116-1a, 116-1b, and 116-1c electrically connected to the base structure 112-1 via a set of electrically-conductive bridges 118 (e.g., the segment 116-1a connects to base structure 112-1 via a first bridge 118-1 and via a second bridge 118-2). In this case, the segments 116 may be positioned proximate to a corresponding waveguide 120. For example, the segments 116-1a through 116-1c are positioned proximate to the waveguide 120-1 and the segments 116-2a through 116-2c are positioned proximate to the waveguide 120-2. In some implementations, a segment 116 may be positioned proximate to a corresponding waveguide 120 by the segment 116 being connected to, covering, or in a stack-up with at least a portion of the waveguide 120. In some implementations, segments 116 may be separated by a non-conductive medium or partially conductive medium. For example, segment 116-1a may be separated from segment 116-1b by a dielectric material or other gap (e.g., air).

Segments 116 of a loading line 114 may be associated with a length (L) and a periodicity (P) (e.g., which represents a distance between an end of a first segment 116 and a corresponding end of a second segment 116, such as a distance between a rightmost end of the segment 116-1b and a rightmost end of the segment 116-1c, as shown). In some implementations, an operating frequency of the electro-optic modulator 100 may be associated with the length and the period for segments 116 of the loading line 114. In some implementations, multiple (or all) segments 116 may share a common length. In some implementations, a first segment 116 may have a different length than a second segment 116. In some implementations, the periodicity may be uniform for one or more loading lines 114. For example, the periodicity of the segment 116-1c relative to the segment 116-1b may be the same as the periodicity of the segment 116-1b relative to the segment 116-1a. Similarly, the periodicity of segments 116-1 of the electrode 110-1 may be the same as the periodicity of segments 116-2 of the electrode 110-2. Alternatively, the periodicity may vary between different sets of segments 116. For example, the periodicity of the segment 116-1c relative to the segment 116-1b may be different from the periodicity of the segment 116-1b relative to the segment 116-1a.

In some implementations, a bridge 118 may be associated with a position with respect to an end of a segment 116. For example, the bridges 118-1 and 118-2 are a distance T_d from respective ends of the segment 116-1a. In some implementations, a position of a first bridge 118 relative to a position of a second bridge 118 is associated with an electro-optic bandwidth of the electro-optic modulator. For example, bridges 118 with a greater amount of separation may be associated with different values for Nm than bridges with a smaller amount of separation, as described in more detail with regard to FIGS. 3A-3C. Similarly, bridges 118 closer to ends of a segment 116 may be associated with different values for Nm than bridges further from the ends of the segment 116.

As shown in FIG. 1B, segments 116 may have different configurations for bridges 118. For example, as shown by reference number 150, a segment 116 may have bridges 118 associated with a common distance from respective ends of the segment 116 (e.g., the same value for T_d). In other words, T_d (1)=T_d (2), where T_d (1) is the value for T_d for a first bridge 118 and T_d (2) is the value for T_d for a second bridge 118. Additionally, or alternatively, segments 116 may have different values for T_d, as shown by reference number 152, where T_d (1)<T_d (2).

Additionally, or alternatively, segments 116 may have a value of 0 for T_d, as shown by reference number 154, where T_d (1)=T_d (2)=0. In this case, the bridges 118 are at respective ends of segment 116. In another example (not shown), one bridge 118 may be at an end of segment 116 and another bridge 118 may not be at an end of segment 116.

Additionally, or alternatively, segments 116 may have other quantities of bridges, such as three or more bridges 118, as shown by reference number 156. In this case, a leftmost bridge 118 is a distance T_d (1) from a left end of segment 116, a rightmost bridge 118 is a distance T_d (2) from a right end of segment 116, and an inner bridge 118 is an internal distance T_di (1) from the leftmost bridge 118 and T_di (2) from the rightmost bridge 118. Additionally, or alternatively, segments 116 may have 4 or more bridges 118 with external distances T_d (1) and T_d(2) for the outermost bridges 118 and internal distances T_di (1), T_di (2), and T_di (3) for the innermost bridges 118, as shown by reference number 158. Additionally, or alternatively, segments 116 may have bridges with the same width, as shown by reference numbers 150-158, or with different widths, as shown by reference number 160, in which a first width w (1) of a first bridge 118 is different from a second width w (2) of a second bridge 118.

FIG. 1C, shows an example graph of Nm versus frequency for the electro-optic modulator 100 (e.g., with two bridges for at least one segment) and another electro-optic modulator with only one bridge for each segment. As shown in FIG. 1C, across a range of frequencies (e.g., a range of frequencies from, for example, 1 gigahertz (GHz)), electro-optic modulator 100 achieves a lower value for Nm then is achieved by another configuration with a single bridge for each segment. In this case, for both the electro-optic modulator 100 and the single bridge configuration, the desired Nopt is approximately 4.0. Accordingly, Nm is closer to Nopt for the electro-optic modulator 100 than for the single bridge configuration across the frequency range of at least 0 GHz to 50 GHz, as shown, As indicated above, FIGS. 1A-1C are provided as an example. Other examples may differ from what is described with regard to FIGS. 1A-1C.

Figure 2:
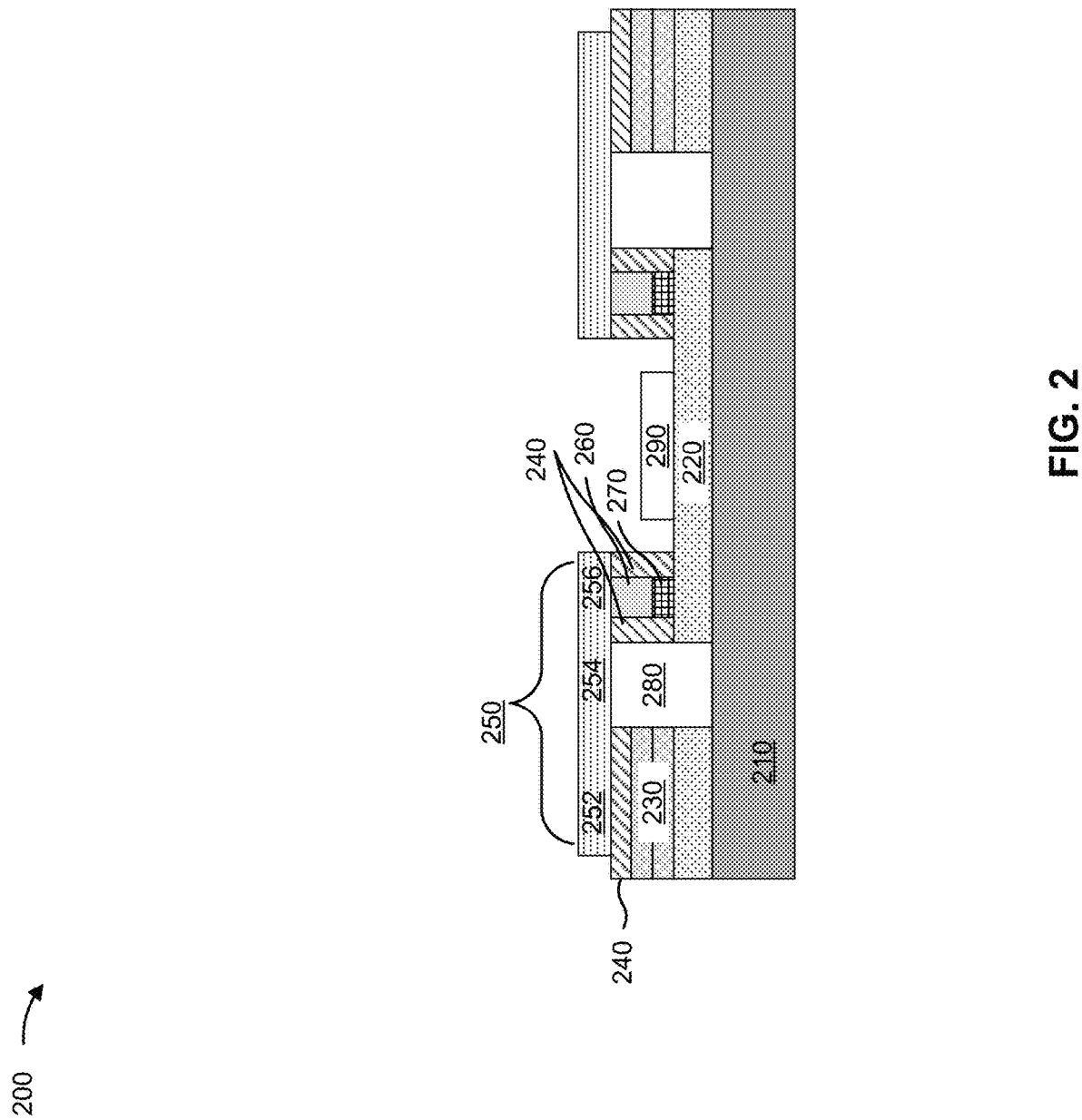
FIG. 2 is a diagram of an example electro-optic modulator described herein.

FIG. 2 is a diagram of an example cross-section of an electro-optic modulator 200 (which may correspond to the electro-optic modulator 100). As shown in FIG. 2, the electro-optic modulator 200 includes a substrate 210, a semiconductor layer 220, a set of intermediate layers 230, a dielectric layer 240, an electrode layer 250 (which may correspond to the segment 116-1b of FIG. 1A, as shown), a p-doped layer 260, and an optical core layer 270. In some implementations, a ground layer 290 is disposed between respective optical cores 270. In some implementations, the ground layer 290 (not shown in FIG. 1A) may be omitted.

In some implementations, the substrate 210 may be a semi-insulating substrate. For example, the substrate 210 may include a semi-insulating indium phosphide (InP) material onto which one or more other layers of material are deposited, such as the substrate 210 being partially covered by the semiconductor layer 220. In this case, the semiconductor layer 220 may include another InP material. For example, the semiconductor layer 220 may include an N+ doped InP substrate. In some implementations, the one or more intermediate layers 230 are formed on at least a portion of the semiconductor layer 220. For example, the one or more intermediate layers 230 may be associated with connecting, routing, or otherwise controlling an electrical signal that is to be modulated onto an optical signal passing through the optical core 270. Additionally, or alternatively, the optical core 270 may be formed on at least a portion of the semiconductor layer 220. For example, the optical core 270 may include a medium through which an optical signal can pass while being modulated by electro-optic interaction from the electrode layer 250.

In some implementations, portions of one or more dielectric layers 240 are formed on the set of intermediate layers 230. Additionally, or alternatively, portions of the one or more dielectric layers 240 are formed around the optical core 270 and the layer 260. The layer 260 may include a p-doped material that, with the semiconductor layer 220 and a portion of the one or more dielectric layers 240, enclose the optical core 270.

In some implementations, electrode layer 250 may be formed onto different portions of the one or more dielectric layers 240 and onto the layer 260. For example, the electrode layer 250 may include a base structure 252, an electrically-conductive bridge 254, and a segment 256. The electrode layer 250 may be a signal electrode that modulates an optical signal passing through the optical core 270, which may form a waveguide to propagate the optical signal in a direction of propagation. In some implementations, the segment 256 may be connected to base structure 252 by multiple electrically conductive bridges 254 (not shown in this cross section of a single bridge 254). In some implementations, each segment 256 of the electro-optic modulator 200 may have multiple electrically-conductive bridges 254. For example, a segmented loading line of the electrode layer 250 may include multiple segments 256 each with multiple electrically-conductive bridges 254 connecting to the base structure 252. Additionally, or alternatively, one or more first segments 256 may include multiple electrically-conductive bridges 254 and one or more second segments 256 may include a single electrically-conductive bridge 254. Additionally, or alternatively, the electro-optic modulator 200 may only have a single segment 256 and the single segment 256 includes multiple electrically-conductive bridges 254. In some implementations, the electrically-conductive bridge 254 spans the air gap and conducts an electrical signal across an air gap 280 from the base structure 252 to the segment 256 to enable the segment 256 to modulate an optical signal traveling through the optical core 270 through electro-optic interaction. In this case, the left-side electrode layer 250 may be associated with a negative bias voltage and the right-side electrode layer 250 may be associated with a positive bias voltage, with the respective bias voltages being applied to the respective electrode layers 250 at a termination point of the electrode layers 250. In some implementations, the electro-optic modulator 200 may form an MZ device, such as an MZ interferometer, where the MZ arms can be driven independently by controlling voltages applied to the respective electrode layers 250.

As indicated above, FIG. 2 is provided as an example. Other examples may differ from what is described with regard to FIG. 2.

Figure 3A:
FIGS. 3A-3C are diagrams of characteristics of electro-optic modulators described herein.
Figure 3B:
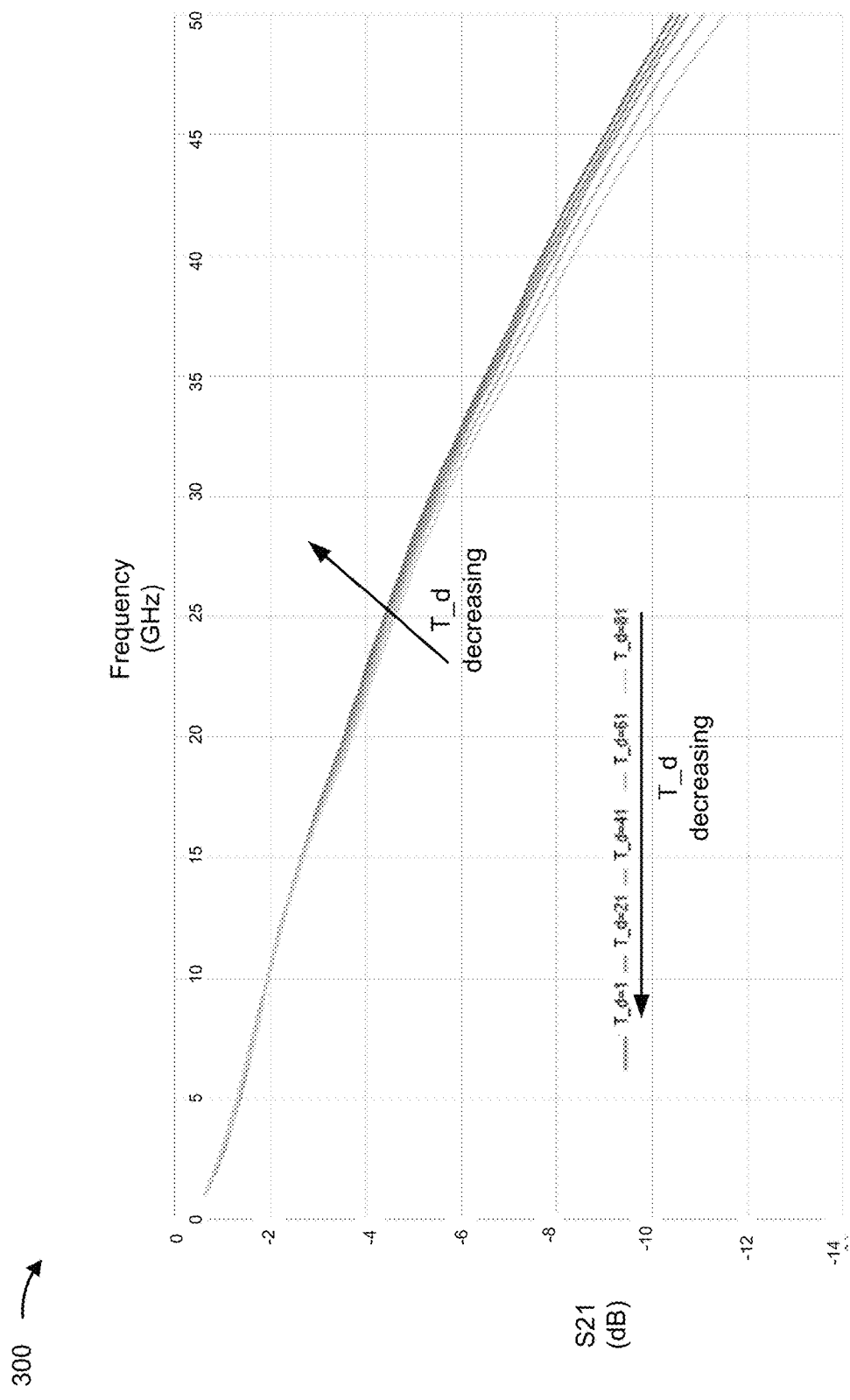
Figure 3C:
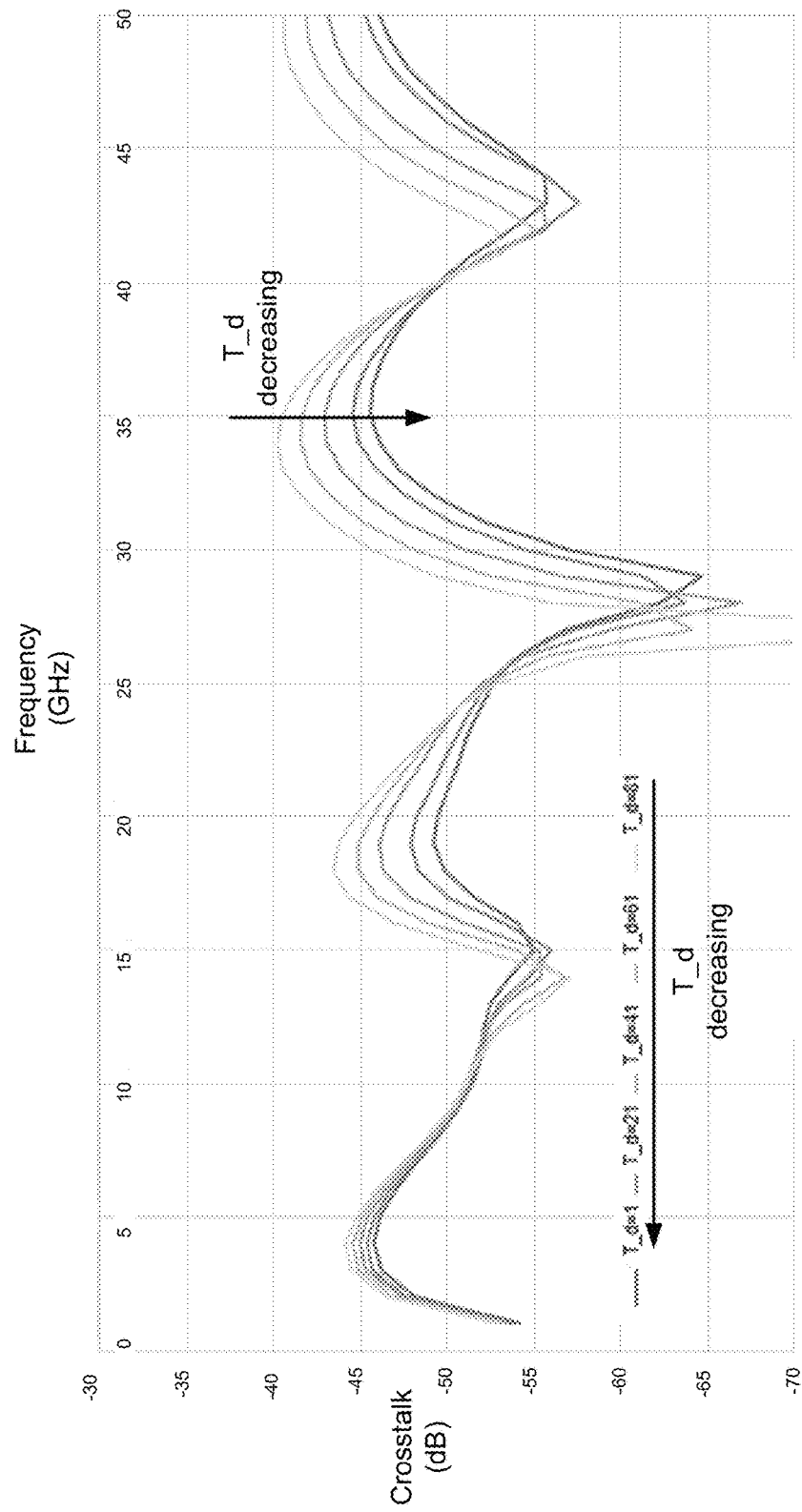

FIGS. 3A-3C are diagrams of an examples 300/310/320 of characteristics of electro-optic modulators, such as the electro-optic modulator 100 of FIG. 1 or the cross section of electro-optic modulator 200 of FIG. 2.

As shown in FIG. 3A, different electro-optic modulators can have different values for T_d for positions of multiple bridges connected to a segment. In this example, the different electro-optic modulators have two bridges with the same value for T_d for each bridge. As shown, as the value for T_d is decreased from T_d=81 micrometers (μm) to T_d=1 μm, a value for Nm can be modified, thereby enabling tuning of the electro-optic modulator to achieve a particular electro-optic bandwidth (as described above, the 3 dB frequency depends on the value of Nm). At the same time, as shown in FIG. 3B as the value for T_d is decreased from 81 μm to 1 μm, a differential S21 parameter (e.g., which represents a measure of differential signals where a signal is positive on a first electrode with a particular magnitude and negative on a second electrode with the same particular magnitude) improves, by improving electrical field confinement relative to a single-bridge configuration. By improving S21 performance, electro-optic modulators with two or more bridges on a segment, as described herein, may enable higher electro-optic bandwidth and improve communication performance.

Improved electrical field confinement allows for better crosstalk performances in the case when multiple MZs with multiple RF line are used. In FIG. 3C, as the value for T_d is decreased from 81 µm to 1 µm, the crosstalk parameter (e.g., a power transferred to other RF lines on the same substrate) improves. By improving cross-talk performance, electro-optic modulators with two or more bridges on a segment, as described herein, may enable usage of multiple MZs with multiple RF lines and enable use of complex modulation schemes without a negative impact to communication performance.

As indicated above, FIGS. 3A-3C are provided as an example. Other examples may differ from what is described with regard to FIGS. 3A-3C.

Figure 4:
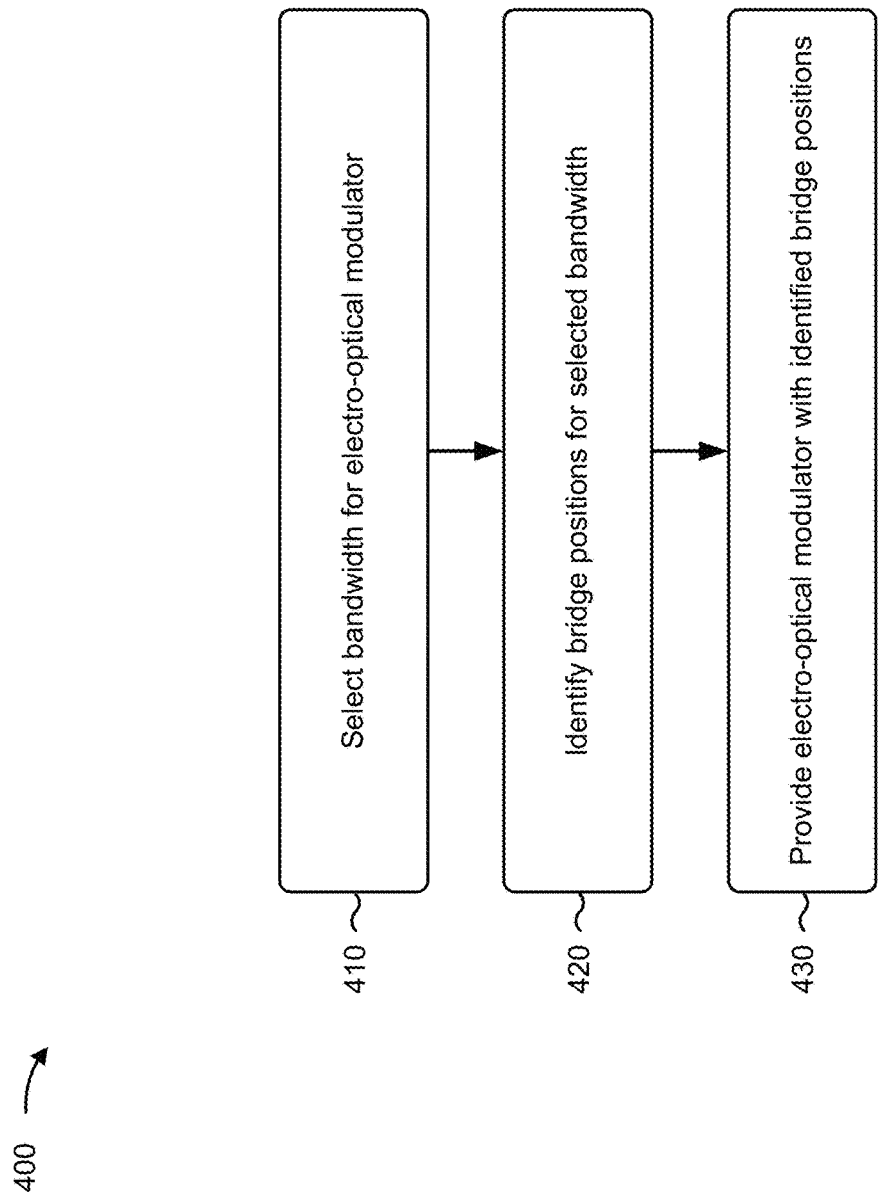
FIG. 4 is a flowchart of an example process relating to configuring an electro-optic modulator described herein.

FIG. 4 is a flowchart of an example process 400 associated with configuring an electro-optic modulator. In some implementations, one or more process blocks of FIG. 4 are performed during manufacture of an electro-optic modulator (e.g., electro-optic modulator 100, cross section of electro-optic modulator 200, the electro-optic modulators described herein with regard to FIG. 3, among other examples).

As shown in FIG. 4, process 400 may include selecting a bandwidth for an electro-optic modulator (block 410). For example, during design and fabrication an electro-optic bandwidth may be selected for an electro-optic modulator, as described above.

As further shown in FIG. 4, process 400 may include identifying bridge positions for the selected bandwidth (block 420). For example, different positions for multiple electrically-conductive bridges associated with a segment may be used, as described above. In some implementations, different quantities of bridges, different configurations of different segments (e.g., different quantities, positions, or dimensions for different segments), or different materials, among other examples may be selected.

As further shown in FIG. 4, process 400 may include providing an electro-optic modulator with the identified bridge positions (block 430). For example, an electro-optic modulator, as described above, may be fabricated using the identified bridge positions. In some implementations, the electro-optic modulator may include an optical waveguide to propagate one or more optical signals in a direction of propagation. In some implementations, the electro-optic modulator may include a signal electrode, associated with the optical waveguide, to propagate a modulation signal in the direction of propagation in order to modulate the one or more optical signals through electro-optic interaction. The signal electrode, of the one or more signal electrodes, may include a segmented loading line that covers a portion of the optical waveguide. A segment, of the segmented loading line, may connect to the signal electrode via a first bridge and a second bridge. The signal electrode may be configured to propagate a modulation signal (e.g., an electrical signal that is to be modulated onto an optical signal) in a direction of propagation. Respective positions or geometries of the first bridge and the second bridge are associated with a microwave refractive index of the modulation signal propagating through the signal electrode.

Process 400 may include additional implementations, such as any single implementation or any combination of implementations described herein and/or in connection with one or more other processes described elsewhere herein.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," "left," "right," "leftmost," "rightmost," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An electro-optic modulator, comprising:
one or more optical waveguides to propagate one or more optical signals in a direction of propagation,
one or more signal electrodes, associated with the one or more optical waveguides, to propagate a traveling wave in order to modulate the one or more optical signals through electro-optic interaction,
wherein a signal electrode, of the one or more signal electrodes, includes a segmented loading line that covers a portion of an optical waveguide of the one or more optical waveguides,
wherein a segment, of the segmented loading line, connects to the signal electrode via a plurality of bridges, and
wherein respective positions or geometries of the plurality of bridges are associated with a microwave refractive index of the traveling wave propagating through the one or more signal electrodes.

2. The electro-optic modulator of claim 1, wherein the plurality of bridges comprises two bridges.

3. The electro-optic modulator of claim 1, wherein the plurality of bridges comprises more than two bridges.

4. The electro-optic modulator of claim 1, wherein a first bridge, of the plurality of bridges, is disposed a first distance from a first end of the segment and a second bridge, of the plurality of bridges is disposed a second distance from a second end of the segment,
wherein the first distance and the second distance are a common distance.

5. The electro-optic modulator of claim 1, wherein a first bridge, of the plurality of bridges, is disposed a first distance from a first end of the segment and a second bridge, of the plurality of bridges is disposed a second distance from a second end of the segment,
wherein the first distance is greater than the second distance.

6. The electro-optic modulator of claim 1, wherein at least one bridge, of the plurality of bridges, is disposed at an end of the segment.

7. The electro-optic modulator of claim 1, wherein each other segment, of the segmented loading line, connects to the signal electrode via a respective single bridge.

8. The electro-optic modulator of claim 1, wherein at least one other segment, of the segmented loading line, connects to the signal electrode via another plurality of bridges.

9. The electro-optic modulator of claim 1, wherein the segment is associated with a length and is associated with a period relative to one or more other segments, and
wherein an operating frequency of the electro-optic modulator is associated with the length and the period.

10. An electro-optic modulator, comprising:
a waveguide to propagate an optical signal in a direction of propagation,
a signal electrode, associated with the waveguide, to modulate the optical signal,
wherein the signal electrode includes:
a base structure,
a loading line structure comprising one or more segments,
wherein a segment, of the one or more segments, connects to the base structure via a plurality of electrically-conductive bridges, and
wherein respective positions or geometries of the plurality of electrically-conductive bridges are associated with a microwave refractive index of a traveling wave propagating through the signal electrode.

11. The electro-optic modulator of claim 10, wherein a position of a first electrically-conductive bridge, of the plurality of electrically-conductive bridges, relative to a position of a second electrically-conductive bridge, of the plurality of electrically-conductive bridges, is associated with an electro-optic bandwidth of the electro-optic modulator.

12. The electro-optic modulator of claim 10, wherein a position of an electrically-conductive bridge, of the plurality of electrically-conductive bridges, on the segment is associated with an electro-optic bandwidth of the electro-optic modulator.

13. The electro-optic modulator of claim 10, wherein a length of an electrically-conductive bridge, of the plurality of electrically-conductive bridges, is associated with an electro-optic bandwidth of the electro-optic modulator.

14. The electro-optic modulator of claim 10, wherein the signal electrode is configured to:
propagate a modulation signal in the direction of propagation.

15. The electro-optic modulator of claim 10, wherein the plurality of electrically-conductive bridges comprises two or more electrically-conductive bridges.

16. The electro-optic modulator of claim 10, wherein the segment is separated from the base structure by an air gap, and
wherein the plurality of electrically-conductive bridges span the air gap.

17. The electro-optic modulator of claim 10, wherein a first segment, of the one or more segments, is separated from a second segment, of the one or more segments, by a gap.

18. An electro-optic modulator, comprising:
an optical waveguide to propagate one or more optical signals in a direction of propagation,
a signal electrode, associated with the optical waveguide, to propagate a modulation signal in the direction of propagation in order to modulate the one or more optical signals through electro-optic interaction,
wherein the signal electrode includes a segmented loading line that covers a portion of the optical waveguide,
wherein a segment, of the segmented loading line, connects to the signal electrode via a first bridge and a second bridge, and
wherein respective positions or geometries of the first bridge and the second bridge are associated with a microwave refractive index of the modulation signal propagating through the signal electrode.

19. The electro-optic modulator of claim 18, wherein the first bridge is disposed a first distance from a first end of the segment and the second bridge is disposed a second distance from a second end of the segment,
wherein the first distance and the second distance are a common distance.

20. The electro-optic modulator of claim 18, wherein the first bridge is disposed a first distance from a first end of the segment and the second bridge is disposed a second distance from a second end of the segment,
wherein the first distance is greater than the second distance.

* * * * *